United States Patent
Liu et al.

(10) Patent No.: US 10,963,764 B2
(45) Date of Patent: Mar. 30, 2021

(54) CIRCUITS AND SYSTEMS FOR LOW POWER MAGNETIC SECURE TRANSMISSION

(71) Applicant: Integrated Device Technology, Inc., San Jose, CA (US)

(72) Inventors: Rui Liu, Fremont, CA (US); Tao Qi, San Diego, CA (US); Lijie Zhao, San Jose, CA (US); Gustavo James Mehas, Mercer Island, WA (US); Tae Kwang Park, San Jose, CA (US); Zhitong Guo, San Jose, CA (US); Siqiang Fan, Foothill Ranch, CA (US)

(73) Assignee: Integrated Device Technology, Inc., San Jose, CA (US)

(*) Notice: Subject to any disclaimer, the term of this patent is extended or adjusted under 35 U.S.C. 154(b) by 0 days.

(21) Appl. No.: 16/510,498

(22) Filed: Jul. 12, 2019

(65) Prior Publication Data
US 2019/0332909 A1    Oct. 31, 2019

Related U.S. Application Data

(62) Division of application No. 15/688,682, filed on Aug. 28, 2017, now Pat. No. 10,360,485.
(Continued)

(51) Int. Cl.
*G06K 7/08* (2006.01)
*G06K 19/06* (2006.01)
(Continued)

(52) U.S. Cl.
CPC ....... *G06K 19/06206* (2013.01); *G06K 7/084* (2013.01); *G06K 7/10316* (2013.01); *G06K 19/07779* (2013.01); *G06Q 20/3278* (2013.01)

(58) Field of Classification Search
USPC ........................................................ 235/449
See application file for complete search history.

(56) References Cited

U.S. PATENT DOCUMENTS 5,397,967 A    3/1995 Carobolante et al.
5,663,647 A *  9/1997 Wirth ................. G01R 33/3852
                                              324/322
(Continued)

FOREIGN PATENT DOCUMENTS

CN    102388530 A    3/2012
CN    105027443 A    11/2015

OTHER PUBLICATIONS

Supplementary Partial European Search Report form European Patent Application No. 17847367.4, dated Feb. 11, 2020, pp. 1-13.
(Continued)

*Primary Examiner* — Tuyen K Vo
(74) *Attorney, Agent, or Firm* — Haynes and Boone, LLP

(57) ABSTRACT

According to another embodiment, a system includes a driver circuit that drives a first output and a second output; a coil coupled between the first output and the second output such that the driver circuit drives current through the coil in response to control signals; and a programmable slew circuit coupled to the driver circuit. In some embodiments, a switch is coupled between the first output and the coil. In some embodiments an over-voltage protection circuit is coupled to protect the driver circuit.

5 Claims, 9 Drawing Sheets

Related U.S. Application Data

(60) Provisional application No. 62/481,864, filed on Apr. 5, 2017, provisional application No. 62/380,962, filed on Aug. 29, 2016.

(51) Int. Cl.
*G06K 7/10* (2006.01)
*G06K 19/077* (2006.01)
*G06Q 20/32* (2012.01)

(56) References Cited

U.S. PATENT DOCUMENTS

| | | | | |
|---|---|---|---|---|
| 5,977,737 | A | * | 11/1999 | Labriola, II .......... G05B 11/28 318/560 |
| 5,988,512 | A | * | 11/1999 | Eisele .................... G06F 3/0623 235/492 |
| 6,084,378 | A | * | 7/2000 | Carobolante ......... H02P 25/034 318/254.2 |
| 6,087,882 | A | * | 7/2000 | Chen .................. H04L 25/0266 327/333 |
| 2010/0164462 | A1 | | 7/2010 | Yen et al. |
| 2010/0308888 | A1 | | 12/2010 | Kubo |
| 2011/0242868 | A1 | | 10/2011 | Gray et al. |
| 2012/0087154 | A1 | | 4/2012 | Maisel et al. |
| 2012/0104961 | A1 | | 5/2012 | Iwamoto et al. |
| 2015/0365003 | A1 | | 12/2015 | Sadwick |
| 2016/0149416 | A1 | | 5/2016 | Ha et al. |
| 2016/0226472 | A1 | | 8/2016 | De Geeter et al. |
| 2017/0126131 | A1 | | 5/2017 | Jeong |

OTHER PUBLICATIONS

International Search Report for PCT Application No. PCT/US2017/049119 Issued by the U.S. International Searching Authority dated Dec. 22, 2017; pp. 1-4.

Written Opinion for PCT Application No. PCT/US2017/049119 Issued by the U.S. International Searching Authority dated Dec. 22, 2017; pp. 1-8.

Office Action dated Dec. 23, 2020 issued in related Chinese Patent App. No. 201780066452.1 (23 pages with English translation).

\* cited by examiner

CIRCUITS AND SYSTEMS FOR LOW POWER MAGNETIC SECURE TRANSMISSION

RELATED APPLICATIONS

The present application is a divisional of U.S. patent application Ser. No. 15/688,682, filed Jun. 28, 2017, which claims priority to U.S. Provisional Application 62/380,962, filed on Aug. 29, 2016, and to U.S. Provisional Application 62/481,864, filed on Apr. 5, 2017, each of which is herein incorporated by reference in their entirety.

FIELD

The present disclosure relates generally to inductive drivers, and more particularly circuits and systems for low power magnetic secure transmission.

BACKGROUND

Magnetic Secure Transmission (MST) is a technology that typically uses an inductor or transmitter coil to emit a magnetic signal that emulates the magnetic stripe on a traditional magnetic stripe card, such as a credit card, a debit card, an identification card, a key, and/or the like. A MST driver sends a signal to an inductive coil that causes the inductive coil to send a magnetic signal from the device using the MST driver to a magnetic card reader in a payment terminal, a lock, and/or the like. The magnetic signal emulates the magnetic pattern of a magnetic stripe and thus emulates the physical swiping of a card without having to use the card and without having to upgrade the hardware or software of the magnetic card reader. This allows smart phones, fobs, wearable devices (e.g., a smart watch), and other smart devices to emulate the functionality of magnetic stripe cards with the existing card reading infrastructure.

Because the MST driver and inductive coil are typically installed in a battery-powered embedded system (e.g., a smart phone, fob, wearable device, or other smart device), power consumption of the MST driver and inductive coil is important. Accordingly, it would be advantageous to develop lower power MST circuits and systems.

SUMMARY

In accordance with aspects of the present invention, a system for transmitting magnetic data includes a circuit that drives a first output and a second output; and a switch that couples the first output to the second output through a coil in response to a control signal. The switch receives the control signal and couples the first output to the coil in response to the control signal, an opposite side of the coil being coupled to the second output.

According to an exemplary embodiment, a system for emitting a magnetic field includes a buck converter for outputting a voltage, a full bridge driver coupled to the voltage output by the buck converter and configured to control polarity of a current through a first inductor coupled to the full bridge driver, and an over voltage protection circuit configured to protect the full bridge driver.

According to another exemplary embodiment, a driver circuit for an inductor includes a buck converter for outputting a voltage, a full bridge driver coupled to the voltage output by the buck converter and configured to control polarity of a current through the first inductor coupled to the full bridge driver, and an over voltage protection circuit configured to protect the full bridge driver.

According to another exemplary embodiment, a driver circuit for an inductor includes a first switch for coupling an input voltage to a first lead of an inductor, a second switch for coupling the input voltage to a second lead of the inductor, a third switch coupled between the first lead of the inductor and ground, a fourth switch coupled between the second lead of the inductor and ground, a first amplifier for controlling the third switch based on a first current through the third switch and a first reference current, a second amplifier for controlling the fourth switch based on a second current through the fourth switch and a second reference current, and a controller for controlling the first switch, the second switch, the first threshold, and the second threshold.

According to another embodiment, a system includes a driver circuit that drives a first output and a second output; a coil coupled between the first output and the second output such that the driver circuit drives current through the coil in response to control signals; and a programmable slew circuit coupled to the driver circuit. In some embodiments, a switch is coupled between the first output and the coil. In some embodiments an over-voltage protection circuit is coupled to protect the driver circuit.

These and other embodiments are further discussed below with respect to the following figures.

DETAILED DESCRIPTION

Figure 1:
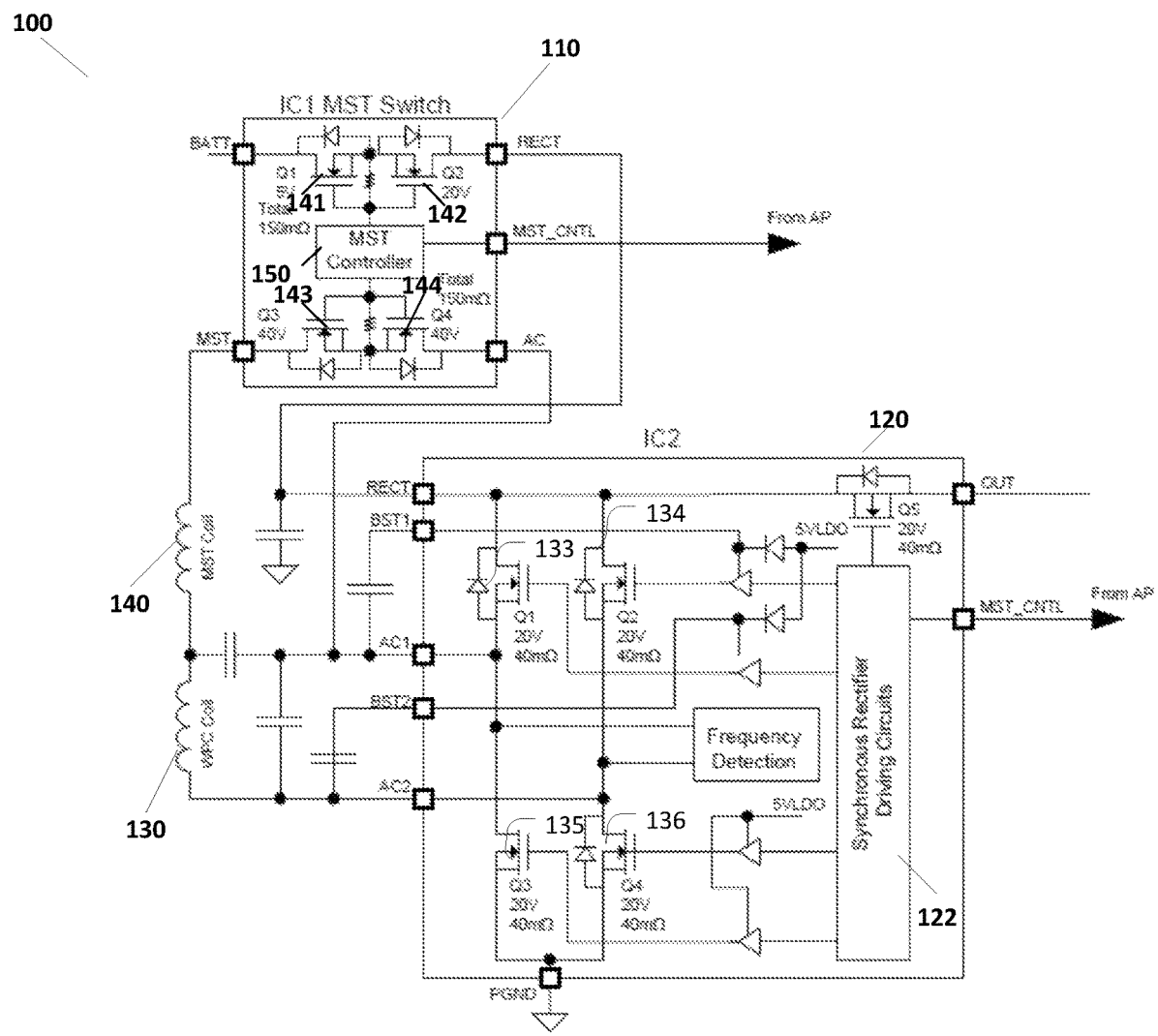
FIG. 1 illustrates a conventional system for transmission of data.

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions. In addition, to avoid unnecessary repetition, one or more features shown and described in association with one embodiment may be incorporated into other embodiments unless specifically described otherwise or if the one or more features would make an embodiment non-functional.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, controller, and circuits described in connection with the embodiments disclosed herein may be implemented or performed with a general-purpose processor, a special-purpose processor, a Digital Signal Processor (DSP), an Application-Specific Integrated Circuit (ASIC), a Field-Programmable Gate Array (FPGA) or other programmable logic device, a controller, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

It should be recognized that the devices of a magnetic secure transmission (MST) system is described herein primarily with respect to functionality of MST and magnetic stripe emulation; however, it should be recognized that the MST system may include additional components to perform other features not specifically described herein or shown in the various figures. For example, MST systems may include I/O modules for interfacing with a processor or other computing device to provide the bit pattern to be emulated, memory for storing instructions and data, various sensors, processors, controllers, voltage regulators, among other components. The figures and accompanying description may, therefore, be somewhat simplified to focus on the various apparatuses and methods that are configured to drive the MST system.

FIG. 1 illustrates a conventional system 100 that can be used for transmission of data, for example data that emulates the standard magnetic strip of payment cards for magnetically secure transmissions (MSTs). As shown in FIG. 1, system 100 includes a first circuit 120 that is generally used to receive wireless power through a wireless power coil 130. System 100 further includes a switch 110 that is used to power a coil 140 that is used to transmit magnetic strip data. In some embodiments, wireless power coil 130 and MST coil 140 may be the same coil. When switch 120 is active, current can be provided through switch 110 to coil 140 in order to transmit data. In some embodiments, MST switch 110 and first circuit 120 can reside on separate integrated circuits, although they may also be combined into a single integrated circuit.

Data to be transmitted is often transmitted to system 100, for example with an I2C bus, and stored for transmission. MST switch 110 can provide current through MST coil 140 according to the data that is to be transmitted.

First circuit 120 can be used to receive wireless power from coil 130. As is illustrated, a driving circuit 122 controls a bridge rectifier formed by transistors 132 (Q1), 133 (Q2), 134 (Q3), and 136 (Q4) in circuit 120 to receive power from coil 140 through inputs AC1 and AC2, through coil 140, in alternating fashion and can further be used to drive current through MST coil 130. Rectified power RECT can be provided to charge external loads and to charge batteries or other storage mechanisms.

In switch 110, battery power and rectifier power is provided through transistors 141 (Q1) and 142 (Q2), respectively, as is determined by MST controller 150. Further, circuit 120 can provide signal to AC1 and AC2 such that, depending on the output from circuit 122, AC1 is at the RECT voltage and AC2 is ground or AC1 is ground and AC2 is at the RECT voltage. In switch 110, with transistors 143 (Q3) and 144 (Q4) of switch 110, coil 140 is coupled to AC1 and WPC coil 130, which is coupled in series with coil 140, is coupled to AC2. Consequently, the system 100, when MST is enabled, can alternately provide current through coil 140 in a positive or negative direction, depending on the voltages provided at AC1 and AC2.

However, system 100 includes the use of switch 110, that includes four external MOSFET transistors. Performance of system 100 depends on the battery voltage input to switch 110, and therefore performance is not consistent due to the variation in the battery voltage. Further, there is no control of the coil current slew rate, causing unreliable performance and unwanted oscillation due to overshoot and/or undershoot of the current through coil 140. As a result, system 100 requires more energy storage capacitors due to the typically low battery voltage involved. Furthermore, there is little to no overvoltage protection.

Figure 2:
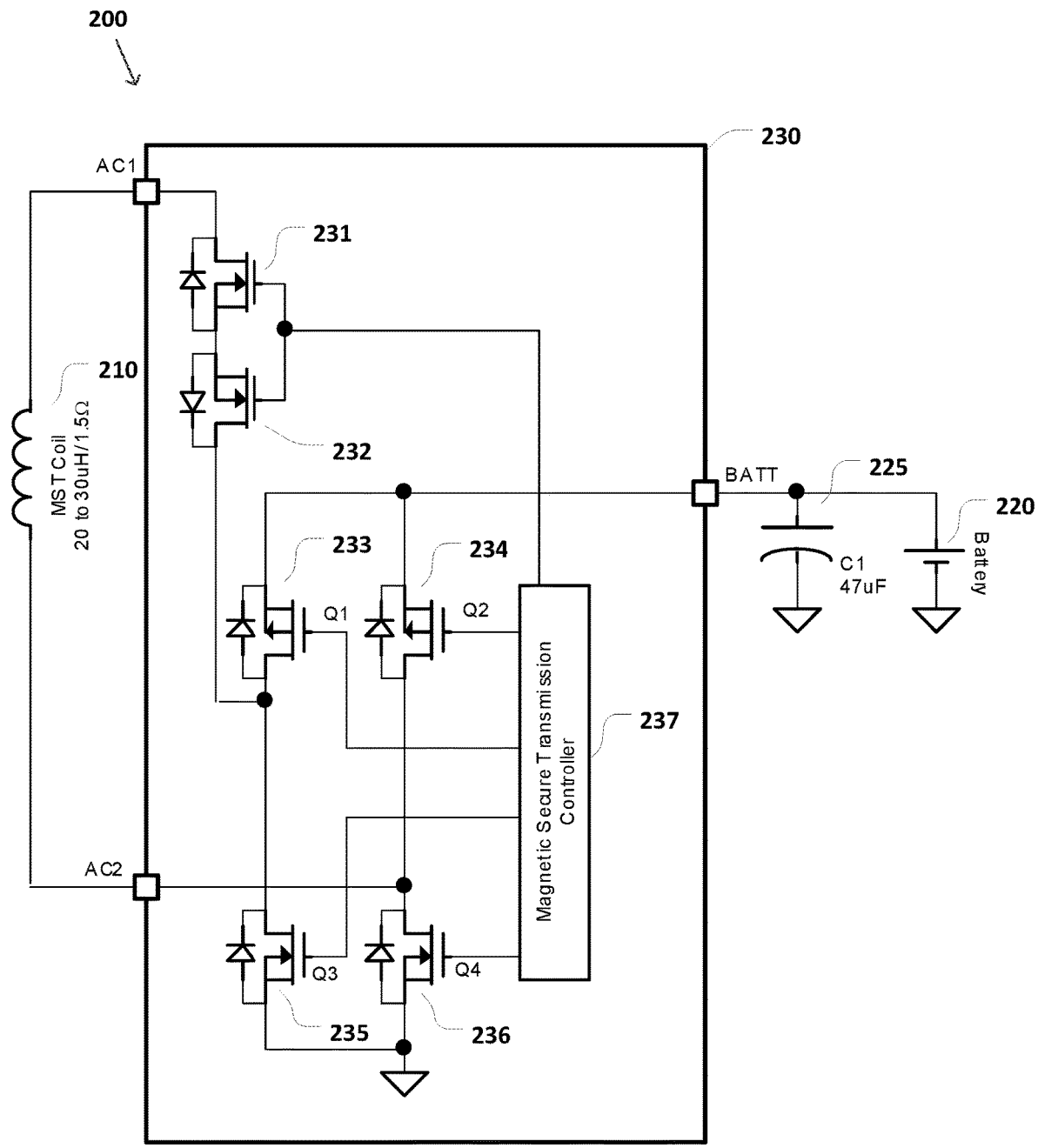
FIG. 2 is a simplified diagram of a magnetic secure transmission system according to some embodiments.

FIG. 2 is a simplified diagram of a magnetic secure transmission (MST) system 200 according to some embodiments. As shown in FIG. 1, MST system 100 includes a MST coil 210 to generate the magnetic field that may be used to emulate the magnetic bit pattern on a magnetic stripe. In some embodiments, MST coil 210 may further be used to receive wireless power. In some examples, MST coil 210 may be an inductor in the range of 20 to 30 micro Henries and with a coil resistance of about 1.5 Ohms. Power for MST system 200 is provided by battery 220, which is in parallel with a capacitor 225 between ground and a common circuit node. Power provided by battery 220 and capacitor 225 is provided by connecting the common circuit node to an input power terminal (BATT) of a MST driver circuit 230. MST coil 210 is coupled to MST driver circuit 230 via terminals AC1 and AC2. In some examples, MST driver circuit 230 may be packaged as an integrated circuit, chip, board, and/or the like.

MST driver circuit 230 includes a pair of field effect transistors (FETs) 231 and 232 to form a back-to-back high voltage protection circuit and/or enable/disable control for MST driver circuit 230. FETs 231 and 232 are shown as N-channel MOSFETs with an intrinsic body diode that acts as a snubber diode during operation of MST driver circuit 230 to reduce the presence of unwanted voltage spikes on MST coil 210 when switching occurs; although other FET and switch variations are possible. FETs 231 and 232 are arranged in back-to-back fashion with their respective sources connected to each other and a common control signal being supplied to their respective gates by an output of a MST controller 237. The drain of FET 231 is coupled to MST coil 210 via terminal AC1 and the drain of FET 232 is connected to a first output of a full bridge driver as is discussed in further detail below. The common control signal may be used to provide an overvoltage protection threshold to block current flow through terminal AC1 (and thus to MST coil 210) and/or act as an overall enable or disable signal for MST driver circuit 230.

MST driver circuit 230 further includes a full bridge driver using FETs 233-236 (also labeled Q1-Q4). FETs 233 and 234 are shown as N-channel MOSFETs with an intrinsic body diode and FETs 235 and 236 are shown as P-channel MOSFETs with an intrinsic body diode; although other FET and switch variations are possible. The sources of FETs 233 and 234 are connected to the input power terminal and are used to source current to MST coil 210 either through FETs 231 and 232 and terminal AC1 or terminal AC2 depending on the direction current is to be driven through MST coil 210. The drain of FET 233 acts as a first output of the full bridge driver and is connected to the drain of FET 232. The drain of FET 234 acts as a second output of the full bridge driver and is coupled to MST coil 210 via terminal AC2. The sources of FETs 235 and 236 are coupled to ground and are used to sink current from MST coil 210 either through FETs 231 and 232 and terminal AC1 or terminal AC2 depending on the direction current is to be driven through MST coil 210. The drain of FET 235 is connected to the drain of FET 233 (the first output of the full bridge driver) and the drain of FET 236 is connected to the drain of FET 234 (the second output of the full bridge driver). The gates of each of FETs 233-236 are connected to respective outputs of MST controller 237.

MST controller 237 manages overall operation of MST driver circuit 230. A first output of MST controller 237 is connected to the sources of FETs 231 and 232 to provide enable/disable and/or over voltage protection to MST driver circuit 230 and MST coil 210. Additional outputs of MST controller 237 are connected to the gates of FETs 233-236 to control operation of the full bridge driver. During operation, MST controller 237 controls the direction of current flow through MST coil 210 in order to reverse the direction of the magnetic field emitted by MST coil 210. When MST controller 237 turns on FETs 233 and 236 by operating them in saturation (and turns off FETs 234 and 235 by operating them in cut off) along with FETs 231 and 232, current is sourced to MST coil 210 from the input power terminal through FET 233, FET 232, FET 231, and terminal AC1 and current is sunk from MST coil 210 through terminal AC2 and FET 236. When MST controller 237 turns on FETs 234 and 235 by operating them in saturation (and turns off FETs 233 and 236 by operating them in cut off) along with FETs 231 and 232, the direction of the magnetic field of MST coil 210 is reversed as current is sourced to MST coil 210 from the input power terminal through FET 234 and terminal AC2 and current is sunk from MST coil through FET 235, FET 232, FET 231, and terminal AC1. Current though MST coil 210 may be stopped by turning off FETs 233-236, turning off FET 231 and 232, or both.

In some examples, the pattern of the magnetic field (i.e., its changes in polarity or direction) may for example, emulate the magnetic bits stored on a magnetic stripe. In some examples, the bit pattern and thus the magnetic field pattern to output may be provided by another processor or controller (not shown), such as via one or more additional terminals (not shown) on MST driver circuit 230.

MST driver circuit 230 of FIG. 2, however, suffers from several disadvantages. In some examples, the coil resistance of MST coil 210 is used to limit the current draw from battery 220 and capacitor 225 through the input power terminal of MST driver circuit 230. In order to operate MST system 200 with sufficient power in the magnetic fields emitted by MST coil 210, MST system 200 is typically over-designed based on the lowest battery operating voltage that is expected. In the examples of FIG. 2, when a minimum battery voltage of 3.5 volts is used, the power consumption from battery 220 is 8.2 Watts (3.5V*3.5V/1.5 Ohms). However, when battery 220 is operating at a higher voltage (e.g., when more fully charged) the power consumption from battery 220 increases even though additional power in the magnetic field is not needed for proper device operation. Using the examples of FIG. 2 again, when the voltage of battery 120 is 4.35 volts, the power consumption from battery increases to 12.6 Watts, which is an increase of over 50 percent over the minimum power that is needed and represents wasted power and reduced battery life. In addition, the higher currents through FETS 231-236 at these higher battery voltages may also increase circuit cost for MST driver 230 as higher power FETs 231-236 may have to be used.

In some examples, the slew rate of MST driver circuit 230 may also be impacted. MST driver circuit 230 provides no slew rate control for the current through MST coil 210. The slew rate is affected by many parameters in the current paths through MST driver circuit 230 from battery 220 to MST coil 210. In order to provide suitable performance of MST driver circuit 230 with respect to slew rate, capacitor 225 should be sufficiently large and placed in close proximity to MST driver circuit 230. In the examples of FIG. 2, capacitor 225 is a large tantalum capacitor with a rating of at least 47 micro Farads.

Figure 3:
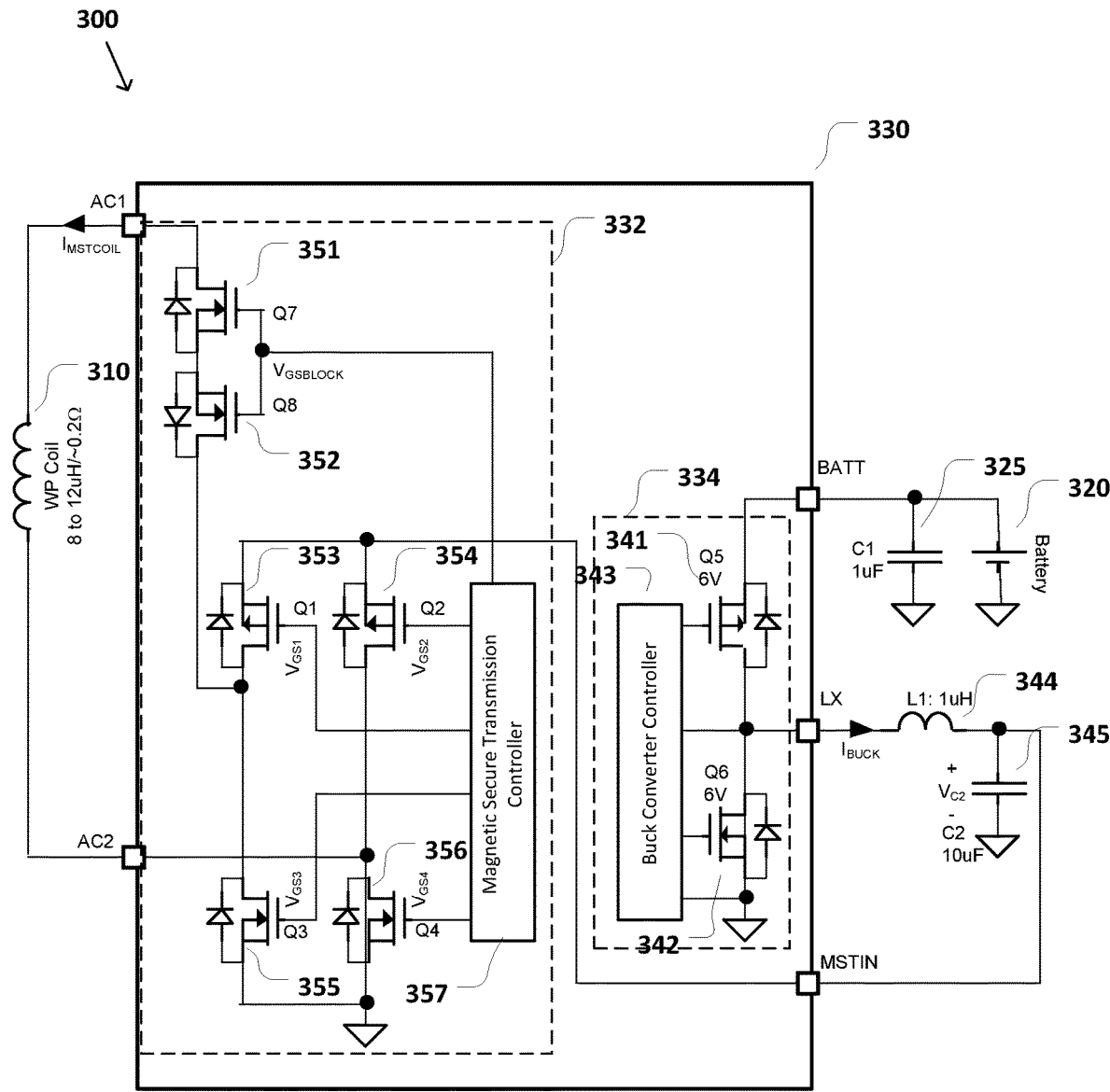
FIG. 3 is a simplified diagram of another magnetic secure transmission system according to some embodiments.

FIG. 3 is a simplified diagram of another MST system 300 according to some embodiments. According to some embodiments, MST system 300 addresses one or more of the problems identified with respect to MST system 200 illustrated in FIG. 2. As shown in FIG. 3, MST system 300 includes a MST coil 310 to generate the magnetic field that may be used to emulate the magnetic bit pattern on a magnetic stripe. In some examples, MST coil 310 may be an inductor in the range of 8 to 12 micro Henries and with a coil resistance of about 0.2 Ohms. Power for MST system 300 is provided by battery 320, which is in parallel with a capacitor 325 between ground and a common circuit node. Power provided by battery 320 and capacitor 325 is provided by connecting the common circuit node to an input power terminal (BATT) of a MST driver circuit 330. MST coil 310 is coupled to MST driver circuit 330 via terminals AC1 and AC2. In some examples, MST driver circuit 330 may be packaged as an integrated circuit, chip, board, and/or the like.

MST driver circuit 330 includes two sub-circuits that include a driver circuit 332 and a buck converter 334. In some embodiments, driver circuit 332 operates in a substantially similar manner to the driver circuit of MST driver circuit 230 with FETs 351-356 and MST controller 357 performing substantially the same functions as FETs 231-236 and MST controller 237 of MST driver circuit 203 except that power to drive the current through MST coil 310 is provided via a power input terminal (MS TIN) coupled to buck converter 334.

Buck converter 334 functions as a step-down DC-to-DC power converter usable to step down the voltage received by MST driver circuit 330 from battery 320 and capacitor 325 via the BATT terminal while also allowing for additional current to be supplied to driver circuit 332 and MST coil 310. Buck converter 334 includes a first FET 341 and a second FET 342 coupled to external energy storage components that include an inductor 344 in series with a capacitor 345. FETs 341 and 342 are shown as a P-channel MOSFET and an N-channel MOSFET, respectively, with an intrinsic body diode that acts as a snubber diode during operation of buck converter 334; although other FET and switch variations are possible. The source of FET 341 is coupled to the common circuit node of battery 320 and capacitor 325 by being connected to the BATT terminal. The drain of FET 341 is connected to the source of FET 342. The source of FET 342 is connected to ground. The gates of FETs 341 and 342, as well as the source of FET 341/drain of FET 342 and the source of FET 342 are each coupled to respective terminals of a buck converter controller 343.

The drains of FETs 341 and 342 are further coupled to the series combination of inductor 344 (with a nominal inductance of 1 micro Henry) and capacitor 345 (with a nominal capacitance of 10 micro Farads) via an LX terminal of MST driver circuit 330. The LX terminal is connected to a first lead of inductor 344. The second lead of inductor 344 is connected to a first lead of capacitor 345 and the MST IN terminal of MST driver circuit 330. The second lead of capacitor 345 is connected to ground.

Buck converter controller 343 manages overall operation of buck converter 334 in order to regulate the voltage at the MST IN terminal of MST driver circuit 330. During a charging mode, buck converter controller 343 turns on FET 341 by operating it in saturation and turns off FET 342 by operating it in cutoff, using the respective terminals connected to the gates of FETs 341 and 342, to allow battery 320 and capacitor 325 to charge capacitor 345 and store energy in inductor 344. In some examples, the voltage variation rate in buck converter 334 may be controlled using buck converter controller 343.

Use of buck converter 334 with driver circuit 332 in MST driver circuit 330 addresses one or more of the deficiencies identified with respect to MST driver circuit 230. In some examples, use of the step-down capabilities of buck converter 334 allows MST system 300 to use MST coil 310 with a lower inductance and a reduced coil resistance. This also allows MST driver circuit 330 to operate at voltages below even the lowest battery operating voltage that is expected from battery 320. For example, when the buck converter 334 output voltage at the MST IN terminal is regulated at 1 volt, MST coil 310 has a coil resistance of 0.2 ohms, and the total switch resistance in driver circuit 332 is 0.3 ohms the current through MST 310 has a magnitude of 2 amperes (1V/(0.2+ 0.3 ohms)) and the power consumption of the MST driver is 2 Watts (1V*2A). Even when buck converter 334 operates at a low efficiency of 85 percent, the power consumption is only 2.35 Watts, which is considerably lower than the 8.2 to 12.6 Watts when using MST system 200.

In some examples, the large (e.g., tantalum) capacitor is not used with MST system 300 because the slew rate of the current through MST coil 310 is better controlled at the more stable stepped-down and regulated voltage provide by buck converter 334 at the MST IN terminal. As shown in FIG. 3, the 47 micro Farad capacitor 225 may be replaced with the much smaller 1 micro Farad capacitor 325, while still maintaining suitable slew rate control. In some examples, the slew rate of MST system 300 is controlled by the constant L/R where L corresponds to the inductance of MST coil 310 and R corresponds to the sum of the coil resistance of MST coil 310 and the total switch resistance of driver circuit 332. In some examples, the slew rate of MST system 300 is controlled by MST controller 357.

In some embodiments, MST system 300 includes further advantages due to the use of the smaller MST coil 310 instead of MST coil 210. In some examples, the smaller MST coil 310 allows MST coil 310 to be used for both wireless power transmission as well as MST functions. This reduces the overall cost and/or complexity of a dual wireless power transmission and MST system.

Figure 4:
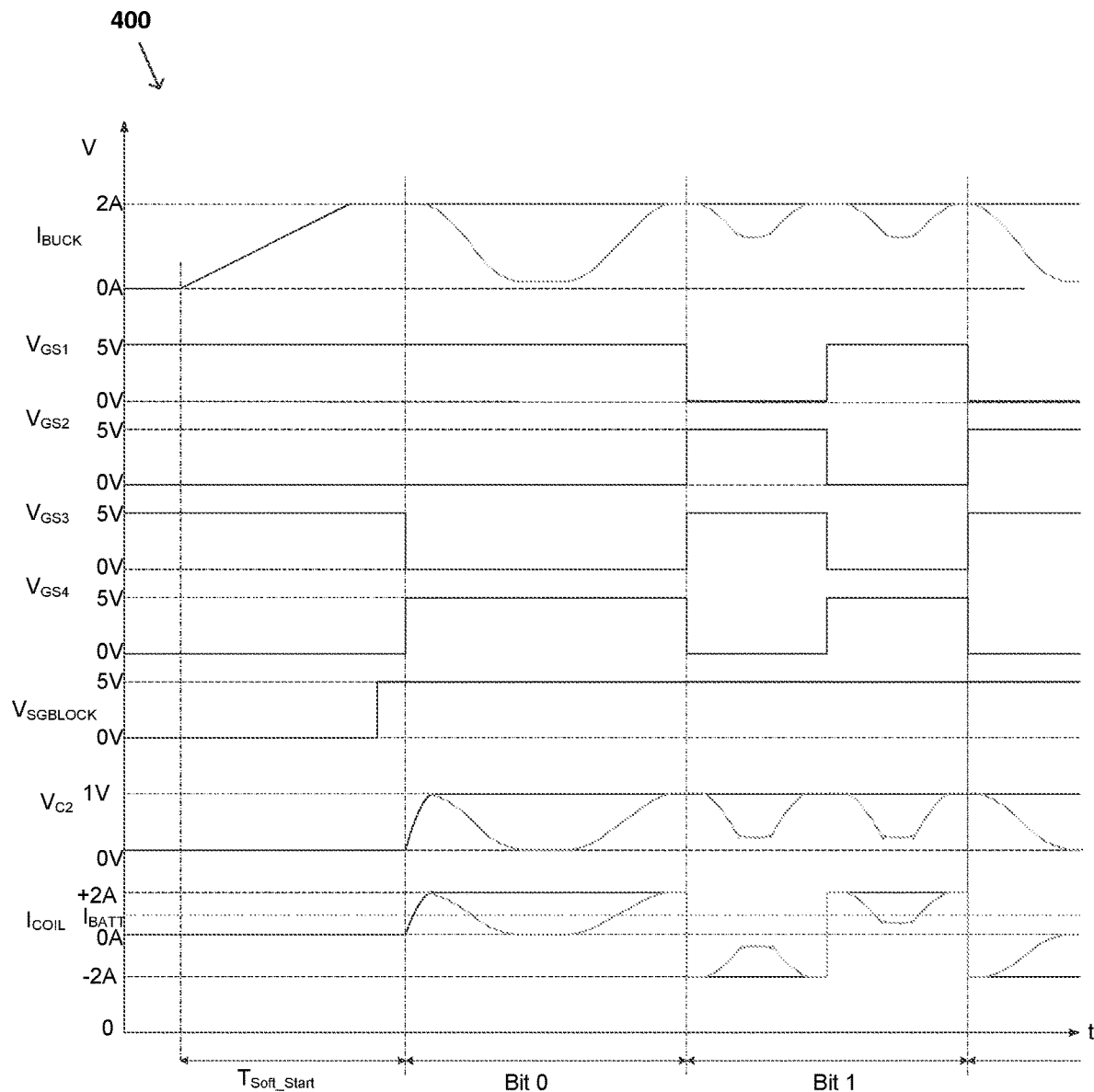
FIG. 4 is a simplified diagram of wave forms demonstrating an exemplary operation of the magnetic secure transmission system of FIG. 2 according to some embodiments.

FIG. 4 is a simplified diagram of wave forms 400 demonstrating an exemplary operation of MST system 300 according to some embodiments. As shown in FIG. 4, wave forms 400 include wave forms for $I_{BUCK}$ representing the current flowing out of the LX terminal of MST driver circuit 330 and into the first lead of inductor 344; the signals $V_{GS1}$, $V_{GS2}$, $V_{GS3}$, and $V_{GS4}$ provided by MST controller 357 to drive the gates of FETS 353-356, respectively; the signal $V_{GSBLOCK}$ provided by MST controller 357 to block current flow through MST coil 310; the signal $V_{C2}$ corresponding to the voltage provided to the MST IN terminal; and $I_{COIL}$ corresponding to the current through MST coil 310 and the magnetic field being emitted by MST coil 310. FIG. 4 includes three regions of operation, a soft-start ($T_{Soft\_Start}$) followed by the transmission of bits 0 and 1.

In the soft start region, $V_{GSBLOCK}$ is kept at zero to maintain $I_{COIL}$ at 0 amperes while buck converter 334 ramps up so that a regulated voltage may be provided to the MST IN terminal and a suitable current is provided for driving MST coil 310. As shown, FETs 353 and 355 are also turned on and FETS 354 and 356 are turned off using $V_{GS1}$, $V_{GS3}$, $V_{GS2}$, and $V_{GS4}$, respectively, to further bias the full bridge driver of driver circuit 332. Near the end of the soft start region, $V_{GSBLOCK}$ is changed to 5 volts to couple both sides of the full bridge driver to MST coil 310.

During the bit 0 region, FETs 353 and 356 are turned on and FETs 354 and 355 are turned off using $V_{GS1}$, $V_{GS4}$, $V_{GS2}$, and $V_{GS3}$, respectively, in order to drive a positive current of 2 amperes through MST coil 310 throughout the duration of the bit 0 region. At the start of the bit 1 region, FETs 353 and 356 are turned off and FETs 354 and 355 are turned on using $V_{GS1}$, $V_{GS4}$, $V_{GS2}$, and $V_{GS3}$, respectively, in order to drive a negative current of 2 amperes through MST coil 310 and then halfway through the bit region, FETs 353 and 356 are turned on and FETs 354 and 355 are turned off using $V_{GS1}$, $V_{GS4}$, $V_{GS2}$, and $V_{GS3}$, respectively, in order to toggle the polarity of $I_{COIL}$ and drive a positive current of 2 amperes through MST coil 310. The change in the polarity of $I_{COIL}$ during the bit 1 region indicates a different bit value than the constant polarity current of $I_{COIL}$ during the bit 0 region. In some examples, this operation is consistent with bits encoded using a return to zero coding, such as Manchester, differential Manchester coding, and/or the like, although it understood that other bit encoding may be used with MST system 300.

Figure 5:
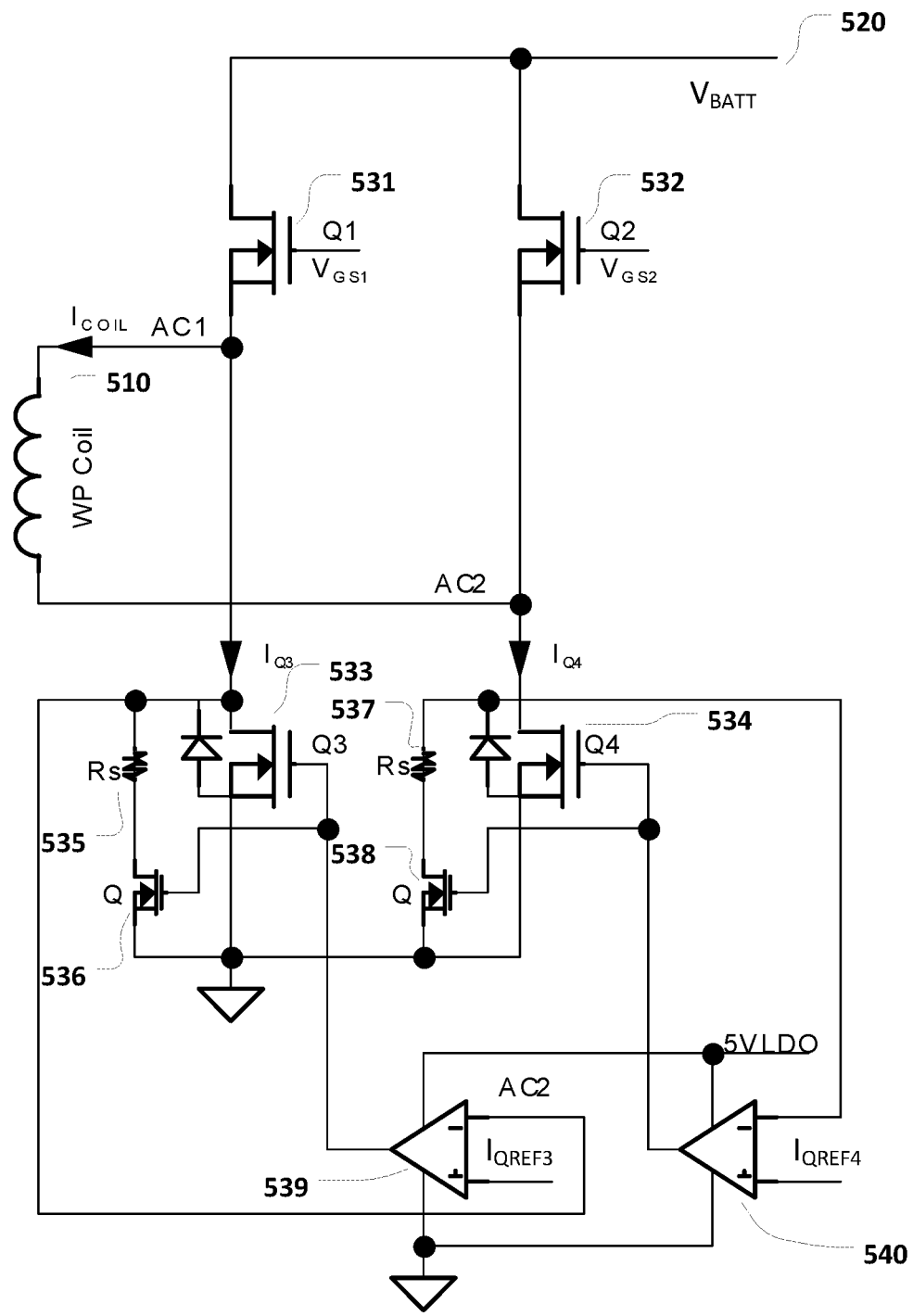
FIG. 5 is a simplified diagram of a driver circuit with transient control for a magnetic secure transmission coil according to some embodiments.

FIG. 5 is a simplified diagram of a driver circuit with transient control for an MST coil 510 according to some embodiments. In some embodiments, the driver circuit of FIG. 5 may be substituted for driver circuit 332 in MST system 300. As shown in FIG. 5, MST coil 510 is coupled to the driver circuit via terminals AC1 and AC2. A regulated voltage is provided to the driver circuit via a $V_{BATT}$ input 520, which may be coupled, for example, to a battery, such as battery 220 and/or 320, or a buck converter, such as buck converter 334. Current is sourced to MST coil 510 using FET 531 through terminal AC1 and FET 532 to source current to MST coil 510 through terminal AC2. In normal operation, only one of FET 531 or 532 is turned on and the other is turned off so that current is sourced to MST coil 510 through one of terminal AC1 or AC2. FETs 531 and 532 are shown as N-channel MOSFETs; although other FET and switch variations are possible. The drains of both FETs 531 and 532 are connected to $V_{BATT}$ and the sources are connected to terminals AC1 and AC2, respectively. Respective control signals ($V_{GS1}$ and $V_{GS2}$) are connected to the respective gates of FETs 531 and 532. In some examples, the respective control signals are provided by a MST controller similar to MST controller 357.

Current is sunk from MST coil 510 using a FET 533 with a parallel shunt resistor 535 and shunt switch (FET) 536 when current is to be sunk from MST coil 510 using terminal AC1 or using a FET 534 with a parallel shunt resistor 537 and shunt switch (FET) 538 when current is to be sunk from MST coil 510 using terminal AC2. FETs 533 and 534 are shown as N-channel MOSFETs with an intrinsic body diode that acts as a snubber diode during operation of the driver circuit to reduce the presence of unwanted voltage spikes on MST coil 510 when switching occurs; although other FET and switch variations are possible. The drain of FET 533 is connected to terminal AC1 and to a first lead of shunt resistor 535. A second lead of shunt resistor 535 is connected to the drain of switch 536 and the sources of FET 533 and switch 536 are connected to ground. Similarly, drain of FET 534 is connected to terminal AC2 and to a first lead of shunt resister 537. A second lead of shunt resister 537 is connected to the drain of switch 538 and the sources of FET 534 and switch 538 are connected to ground.

Control of FET 533 and switch 536 are managed by an amplifier 539 with an inverting input connected to the drain of FET 533 and a non-inverting input connected to a reference current $I_{QREF3}$. Similarly, control of FET 534 and switch 538 are controlled by an amplifier 540 with an inverting input connected to the drain of FET 534 and a non-inverting input connected to a reference current $I_{QREF4}$. Amplifiers 539 and 540 are used to sense the currents through shunt resistors 535 and 537, respectively, and to further these sensed currents to track the reference currents $I_{QREF3}$ and $I_{QREF4}$ during transient events to control the slew rate of the current through MST coil 510. When a transient event is over, either FET 533 or FET 534 is turned on depending upon the desired polarity for the current through MST coil 510. Power is supplied to amplifiers 539 and 540 using a low drop out (LDO) regulator as indicated by the 5VLDO power input. In practice, the combination of FETs 533 and 534 and shunt resistors 535 and 537 functions to sink the current through MST coil 510 as one of FET 533 and shunt resistor 535 or FET 534 and shunt resistor 537 will ramp up the current through MST coil 510 while the other ramps it down during polarity transitions in the current through MST coil 510. Once the transition in the polarity of the current through MST coil 510 is complete, only one pair of FETs 531 and 534 or FETs 532 and 533 will be on.

Figure 6:
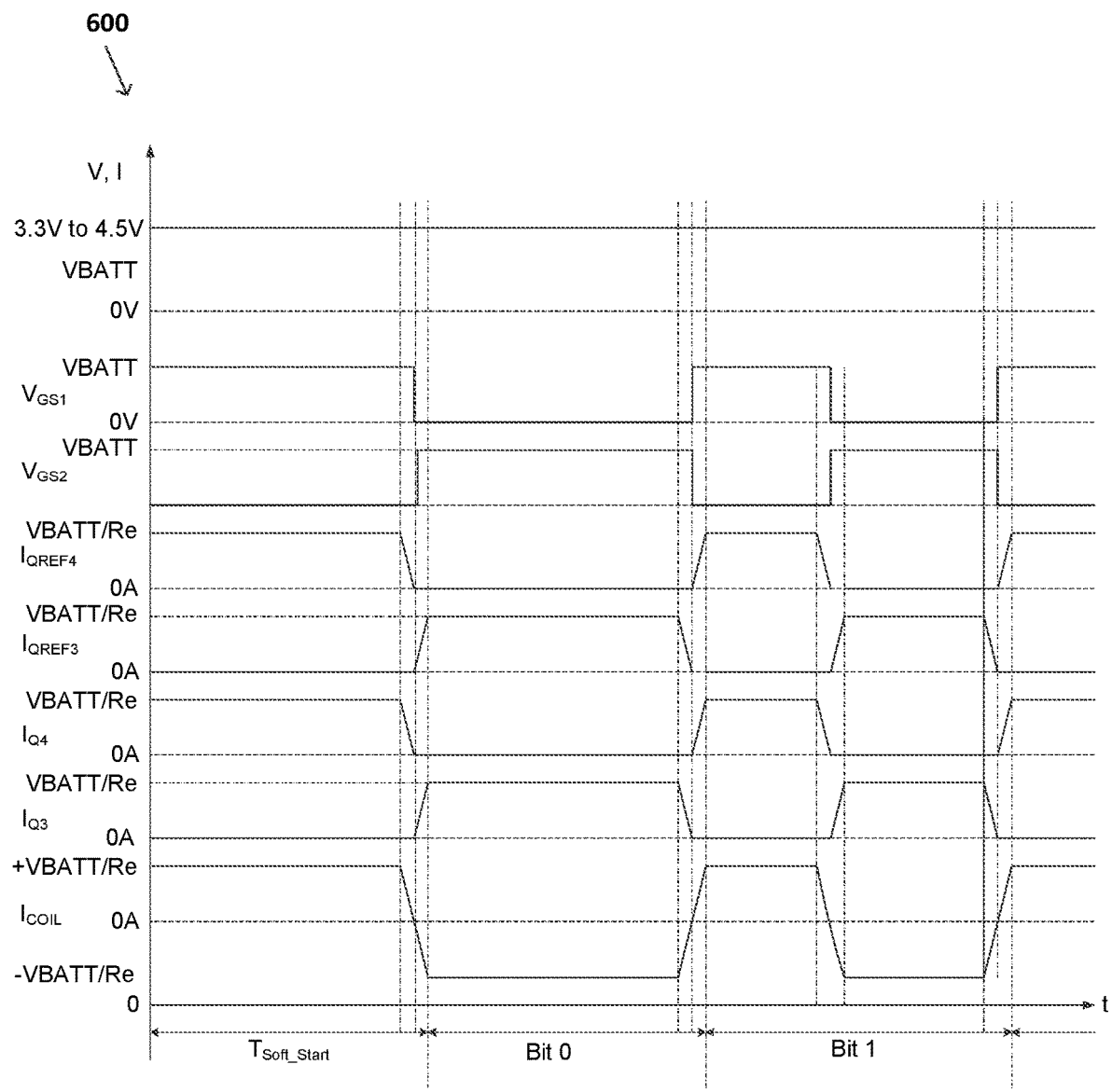
FIG. 6 is a simplified diagram of wave forms demonstrating an exemplary operation of the driver circuit of FIG. 4 according to some embodiments.

FIG. 6 is a simplified diagram of wave forms 600 demonstrating an exemplary operation of the driver circuit of FIG. 5 according to some embodiments. As shown in FIG. 6, wave forms 600 include wave forms for $V_{BATT}$ representing the voltage supplied at the $V_{BATT}$ terminal of the driver circuit; the signals $V_{GS1}$ and $V_{GS2}$ by the MST controller to drive the gates of FETS 531 and 532, respectively; the signals $I_{QREF3}$ and $I_{QREF4}$ used to control operation of FET 533 and shunt resistor 535 and FET 534 and shunt resistor 537, respectively; $I_{Q3}$ and $I_{Q4}$ corresponding to the currents being sunk through terminals AC1 and AC2, respectively, and $I_{COIL}$ corresponding to the current through MST coil 510 and the magnetic field being emitted by MST coil 510. FIG. 6 includes three regions of operation; a soft-start ($T_{Soft\_Start}$) followed by the transmission of bits 0 and 1. Re corresponds to the sum of the coil resistance of MST coil 410 and the total switch resistance of the driver circuit so that the magnitude of the current through MST coil 510 reaches a maximum value of $V_{BATT}/Re$.

In the soft start region, FET 531 is turned on and FET 532 is turned off using $V_{GS1}$ and $V_{GS2}$, respectively while the $I_{QREF3}$ and $I_{QREF4}$ are set to allow sinking of current ($I_{Q4}$) through FET 534 and shunt resistor 537. This allows for biasing of the driver circuit and ramping up of the voltage provided by $V_{BATT}$. This also provides current ($I_{COIL}$) with a positive polarity through MST coil 510.

At the end of the soft start region, FET 531 is turned off and FET 532 is turned on using $V_{GS1}$ and $V_{GS2}$, respectively, and sinking of current is enabled through FET 533 and shunt resistor 535 (and not through FET 534 and shunt resistor 537) by increasing $I_{QREF4}$ and decreasing $I_{QREF3}$. The $I_{QREF4}$ and $I_{QREF3}$ are ramped to their new values to allow a smooth change in polarity in the current through MST coil 510. Further, the ramping of $I_{QREF4}$ and $I_{QREF3}$ are staggered in time to reduce transients during the polarity change in the current through MST coil 510.

At the end of the bit 0 region, FET 531 is turned on and FET 532 is turned off using $V_{GS1}$ and $V_{GS2}$, respectively, and sinking of current is enabled through FET 534 and shunt resistor 537 (and not through FET 533 and shunt resistor 535) by increasing $I_{QREF3}$ and decreasing $I_{QREF4}$. The $I_{QREF3}$ and $I_{QREF4}$ are ramped to their new values to allow a smooth change in polarity in the current through MST coil 510. Further, the ramping of $I_{QREF3}$ and $I_{QREF4}$ are staggered in time to reduce transients during the polarity change in the current through MST coil 510. Halfway through the bit 1 region, FET 531 is turned off and FET 532 is turned on using $V_{GS1}$ and $V_{GS2}$, respectively, and sinking of current is enabled through FET 533 and shunt resistor 535 (and not through FET 534 and shunt resistor 537) by increasing $I_{QREF4}$ and decreasing $I_{QREF3}$. The $I_{QREF4}$ and $I_{QREF3}$ are ramped to their new values to allow a smooth change in polarity in the current through MST coil 510. Further, the ramping of $I_{QREF4}$ and $I_{QREF3}$ are staggered in time to reduce transients during the polarity change in the current through MST coil 510. In some examples, this operation is consistent with bits encoded using a return to zero coding, such as Manchester, differential Manchester coding, and/or the like, although it understood that other bit encoding may be used with the driver circuit of FIG. 5.

Figure 7:
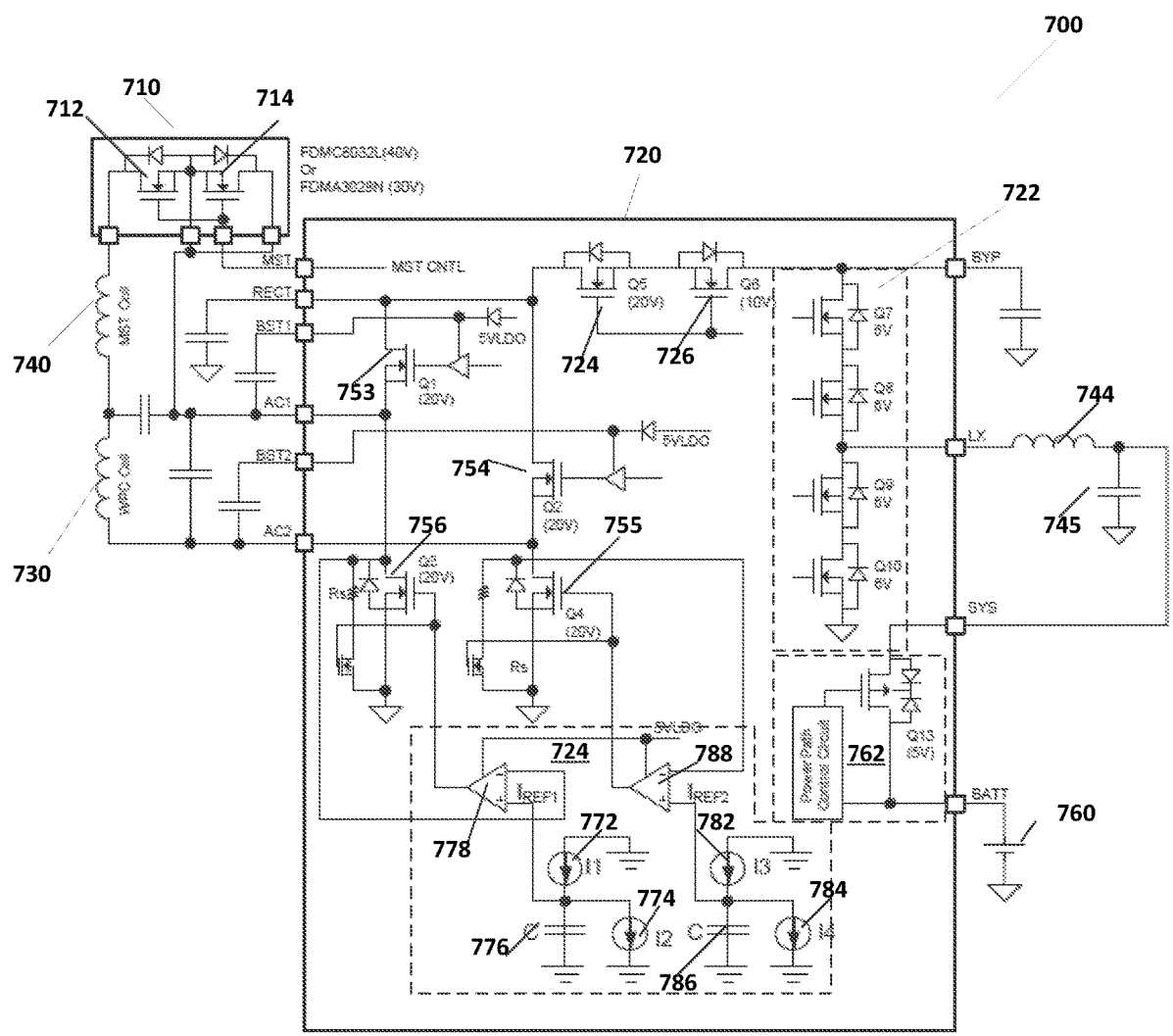
FIG. 7 illustrates an example block diagram of a system for transmission of data according to some embodiments of the present invention.

FIG. 7 illustrates another system 700 for transmitting data according to some embodiments. As is illustrated in FIG. 7, a circuit 720 is coupled to a switch 710. Switch 710 is coupled to provide current through coil 740 and wireless power coil 730 between AC1 and AC2. As illustrated in FIG. 2, switch 710, when activated by a control signal MST CNTL, couples current between AC1 and AC2. Switch 710 includes two N-Channel MOSFETs 712 and 714, thereby reducing the number of switching transistors from that shown in FIG. 1 from four to two.

As is further illustrated in FIGS. 2, AC1 and AC2 can be switched from a positive current to a negative current by switching transistors 753 (Q1) and 754 (Q2) of circuit 720. The gates of transistors 753 and 754 are driven by the battery 760 through a low drop-out (LDO) regulator and a driver, as shown. Turning transistor 753 (Q1) on, for example, allows the RECT signal to be coupled to AC1 while turning transistor 754 (Q2) on allows the RECT signal to be coupled to AC2.

The RECT signal is produced by a reverse boost circuit 722 that includes transistors Q5-Q10. Circuit 722 can replace buck converter circuit 334 of FIG. 3 and is similarly coupled to inductor 744 and capacitor 745 to produce RECT circuit. Reverse boost circuit 722 is powered by a battery 760 through a power control circuit 762. Using reverse boost circuit 720 allows the RECT voltage to be maintained at a higher voltage than the battery voltage and maintained at that higher voltage regardless of voltage variations in the battery voltage. Consequently, reverse boost circuit 720 provides a reliable constant voltage that is independent of any voltage variation that may occur in the battery. Furthermore, because the voltage is higher than the battery voltage, less storage capacity can be used, reducing the size and number of storage capacitors in system 700.

As is further illustrated in system 700, circuit 720 includes transistors 724 and 726, which function as the same with transistors 351 and 352 of FIG. 3. As such, transistors 724 and 726 provide overvoltage protection as discussed above with respect to transistors 351 and 352.

As discussed above, when transistor 753 (Q1) is on, the voltage RECT is coupled to AC1. AC2 is coupled to transistor 755 (Q4), which couples AC2 to ground according to a signal from a slew circuit 724. Similarly, when transistor 754 (Q2) is on, the voltage RECT is coupled to AC2 and AC1 is coupled through transistor 756 (Q3) according to a signal from slew circuit 724.

With regard to transistor 756 (Q3), slew circuit 724 includes current sources 772 (I1) and 774 (I2) along with capacitor 776 (C) that provides a reference voltage to a comparator 778. The comparator 778 compares the voltage from the capacitor 776 with the voltage on AC1 and couples AC1 to ground according to that comparison. With regard to transistor 755 (Q4), AC1 is coupled to ground in response to a comparison at comparator 788 between the voltage at AC2 and the voltage on a capacitor 786 coupled to current sources 782 (I3) and 784 (I4). Current sources 772 (I1), 774 (I2), 782 (I3), and 784 (I4) can be programmed to provide slew rates for the transition of the current through coil 740 between a positive current and a negative current.

Consequently, the slew rate through coil 740 can be programmed for reliable performance and is capable of reducing power consumption to reduce the power dissipation from the battery. This feature may be particularly important for portable devices such as smart watch case devices with small battery supplies.

Figure 8A:
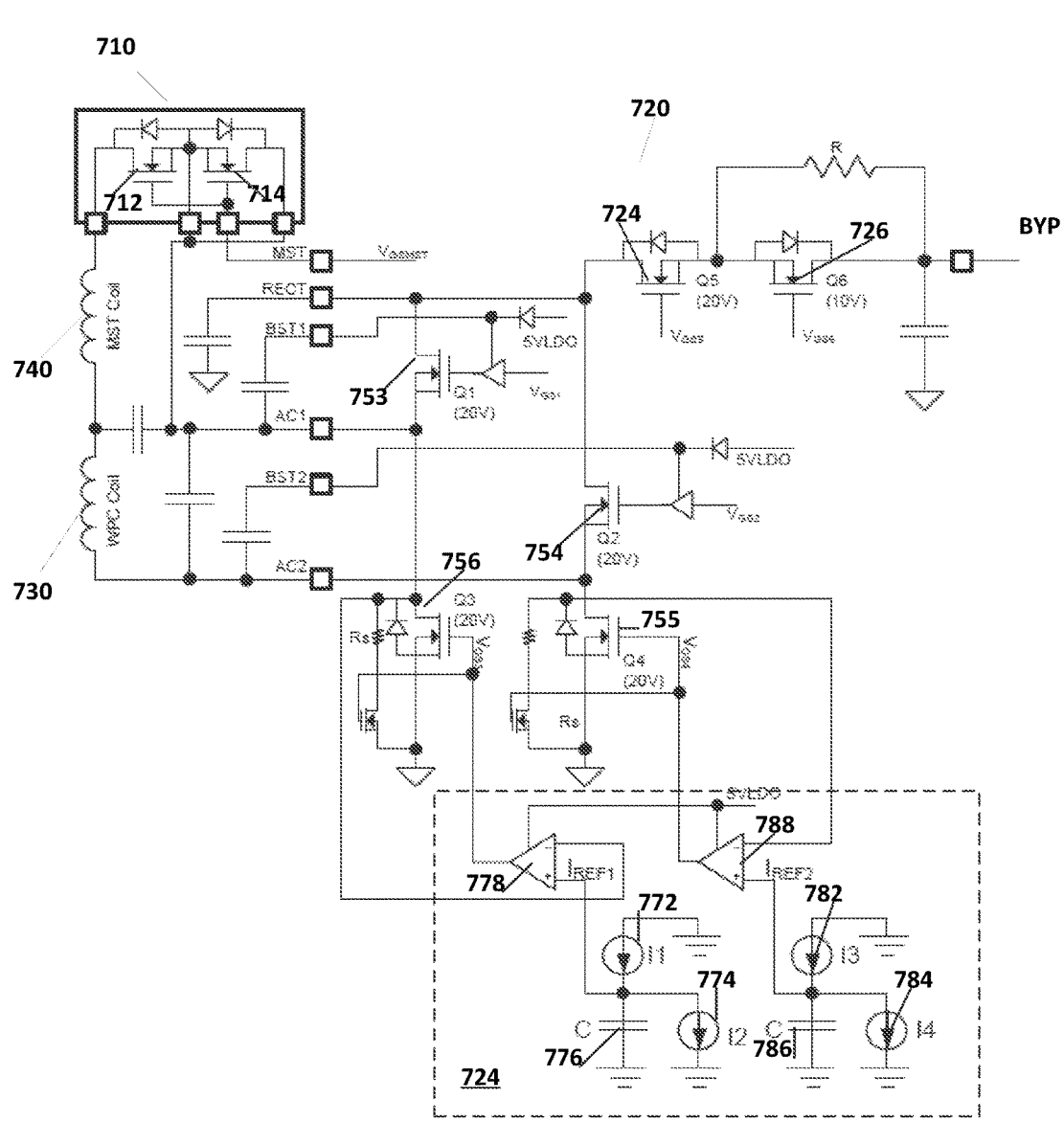
FIGS. 8A and 8B illustrate a timing diagram for transmission of a 0 bit and a 1 bit as magnetic strip data according to some embodiments.
Figure 8B:
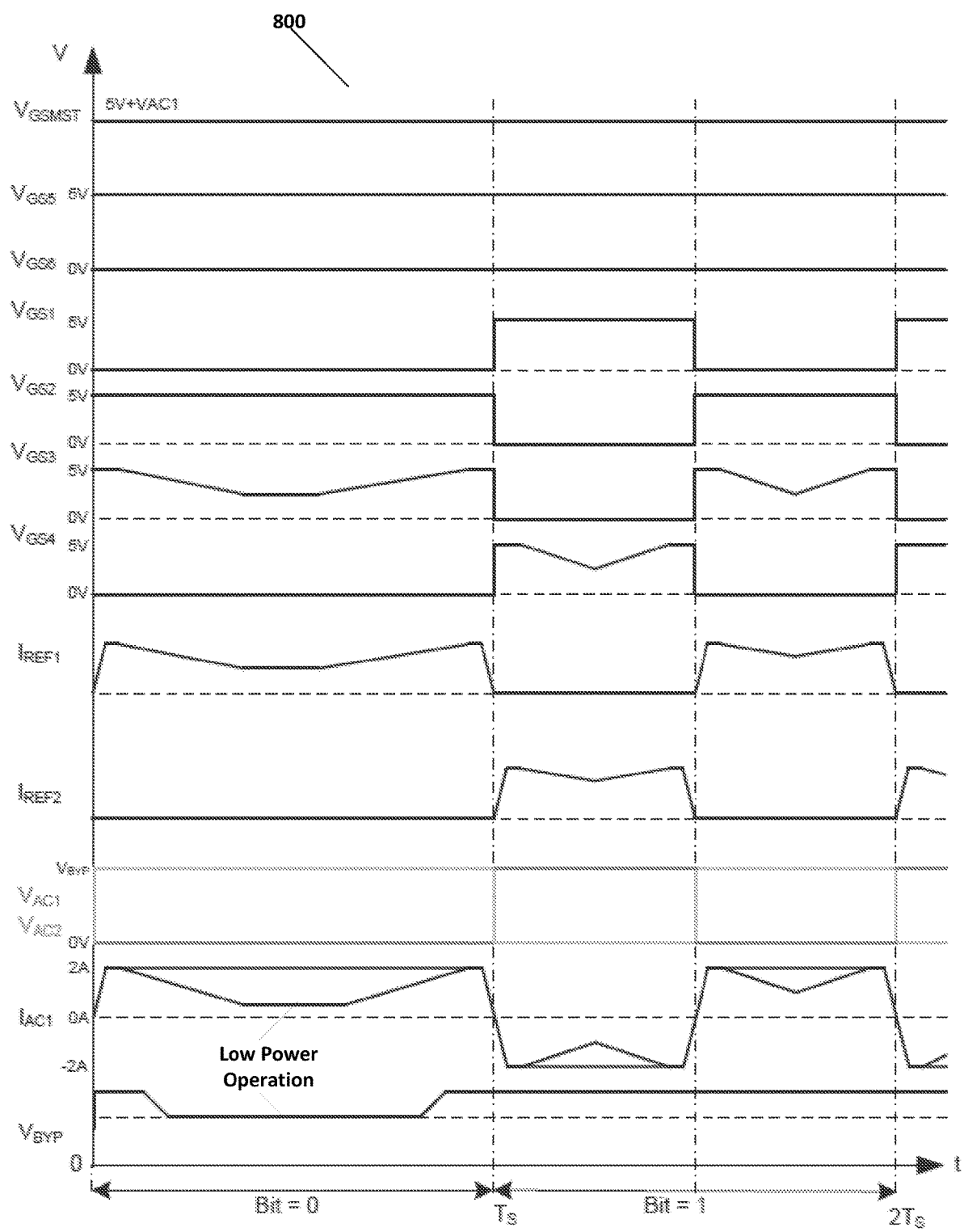

FIGS. 8A and 8B illustrate waveforms 800 for various signals in system 700. FIG. 8A illustrates system 800 with various signals identified that are illustrated the timing diagram of FIG. 8B. As is illustrated in FIG. 8B, the voltage VGSMT is set to 5V+VAC1 and is coupled to the MST control signal. VGS5 is the gate voltage of transistor 724 (Q5) and is set to 5V while VGS6 is the gate voltage of transistor 726 (Q6), which is set to 0V. Consequently, transistor 724 is on and transistor 726, which is bypassed by a resistor, is off. The voltage on BYP is provided by boost circuit 722.

Bit data is set by voltages $V_{GS1}$ and $V_{GS2}$, which drive the gate voltages of transistors 753 (Q1) and 754 (Q2), respectively. As is illustrated in the timing diagram, during a 0-bit transmission $V_{GS1}$ and $V_{GS2}$ are set at 0V and 5V, respectively. During a 1-bit transmission, $V_{GS1}$ is transitioned to 5V while VGS0 is transitioned to 0 volts through half the period and then transitioned back to 0V and 5V, respectively, through the second half of the period in order to create a detectable edge in the transmitted data through during the period.

The voltage $V_{GS3}$ illustrates gate voltage of transistor 756 (Q3) while voltage GS4 illustrates the gate voltage of transistor 755 (Q4). As is shown in the diagram, transistor 756 (Q3) is on during a 0-bit transition and transitions between an off state and an on state during transition of a 1-bit. Transistor 755 (Q4) is off during a 0-bit and transitions between an on state and an off state during transition of a 1-bit. Similarly behavior is exhibited by IREF1 (the voltage on capacitor 776) and IREF2 (the voltage on capacitor 786). As is illustrated, VAC1 is 0V for a 0-bit and transitions between a high voltage and a low voltage for transmission of a 1-bit. VAC2 is opposite and is a high voltage for a 0-bit and transitions between a low voltage and a high voltage for transmission of a 1-bit.

The current through coil 740, denoted IAC1, can be a positive high current during a 0-bit transition and transitions from a negative current to a positive current during a 1-bit transmission (such that there is an edge crossing during the 1-bit transmission). In some embodiments, the boosted voltage VBYF can be reduced during transmission, causing the current IAC1 to be reduced during transmission, in order to reduce power usage. Consequently, the reference voltages in slew circuit 724 and other parameters may be altered without affecting a crossover on IAC1 that may be incorrectly interpreted as a 1-bit.

Circuits and systems for low power magnetic secure transmission include a buck converter for outputting a voltage, a driver coupled to the voltage output by the buck converter and configured to control polarity of a current through a first inductor coupled to the driver, and an over voltage protection circuit configured to protect the driver. In some embodiments, a voltage variation rate of the buck converter is adjusted. In some embodiments, a slew rate of current through the first inductor is controlled. In some embodiments, the full bridge driver is operated in a soft start mode. Some embodiments include a programmable slew rate.

In some embodiments, the system includes a circuit that drives a first output and a second output; and a switch that couples the first output to the second output through a coil in response to a control signal. A switch receives the control signal and couples the first output to the coil in response to the control signal, an opposite side of the coil being coupled to the second output. In some embodiments, the battery voltage may be boosted in order to provide a more reliable first voltage. Some embodiments may include an overvoltage circuit. Furthermore, a slew rate, which in some embodiments can be programmable, can be provided by a slew circuit.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system, comprising
    a driver circuit that drives a first output and a second output;
    a coil coupled between the first output and the second output such that the driver circuit drives current through the coil in response to control signals; and
    a programmable slew circuit coupled to the driver circuit, wherein the driver circuit includes:
        a first transistor that couples a first voltage to the first output in response to a first signal;
        a second transistor that couples the first voltage to the second output in response to a second signal;
        a third transistor that couples the first output to ground in response to a first slew signal from the programmable slew circuit; and
        a fourth transistor that couples the second output to ground in response to a second slew signal from the programmable slew circuit.

2. The system of claim 1, further including a switch coupled between the first output and the coil.

3. The system of claim 2, wherein the switch receives the control signal and couples the first output to the coil in response to the control signal, an opposite side of the coil being coupled to the second output.

4. The system of claim 1, wherein the first voltage is provided from a reverse boost circuit powered by a battery.

5. The system of claim 1, further including an overvoltage protection circuit configured to protect the driver circuit.

* * * * *